Patented Jan. 18, 1938

2,105,697

UNITED STATES PATENT OFFICE 2,105,697

ADHESIVE AND COATING COMPOSITION

Alexander D. Macdonald, Malden, Mass., assignor to B. B. Chemical Co., Boston, Mass., a corporation of Massachusetts No Drawing. Application September 5, 1934, Serial No. 742,873

7 Claims. (Cl. 134—26)

This invention relates to adhesive and coating compositions, and more particularly to such compositions embodying polymerized haloprene.

An object of this invention is to provide a fluid adhesive or coating composition embodying polymerized haloprene, more particularly polymerized chloroprene, and which may be employed in conjunction with rubber articles in cases where it is desired that the polymerized chloroprene adhere to the rubber but where deterioration of or solvent attack upon the rubber is to be avoided. An example of such use is the application of a fluid polymerized chloroprene adhesive to the rubber thread-wound core of a golf ball in order to secure the cover adhesively to the golf ball core and where substantial dissolving or other deteriorating attack upon the tension-wound threads of the core would weaken the threads or cause them to snap and seriously damage if not destroy the core. The securing of a cover to the core of playing balls, such as golf balls, and involving the use of polymerized chloroprene, is disclosed and claimed in the co-pending United States application Serial No. 742,872, filed Sept. 5, 1934, in the name of Alexander D. Macdonald.

In the accomplishment of the above and other objects, I have found that compositions particularly advantageous for many purposes may be prepared by dissolving polymerized chloroprene in solvent material selected from the cyclic ethers of the glycols, also known as alkylene oxides. In this class of compounds, furfurane is to be considered as the cyclic ether of an unsaturated glycol.

Among the cyclic ethers of the glycols contemplated by this invention, including single and double ethers, may be mentioned the following by way of specific example:

| Name | Boiling point |
|---|---|
| Ethylene oxide | Boiling point 12.5° C. |
| α-Propylene oxide | Boiling point 35° C. |
| Iso-butylene oxide | Boiling point 51–52° C. |
| Tetramethylene oxide (Tetrahydrofurfurane) | Boiling point 57° C. |
| γ-Pentylene oxide | Boiling point 77° C. |
| δ-Hexylene oxide | Boiling point 104° C. |
| Ethylene methyl ether | Boiling point 73° C. |
| Diethylene oxide (Dioxan) (Cyclic double ether) | Boiling point 102° C. |
| Furfurane | Boiling point 31° C. |
| 1-Methyldihydrofurfurane | Boiling point 65° C. |

Examples of fluid adhesive compositions according to this invention are as follows:

Example I

|  | Parts by weight |
|---|---|
| Polymerized chloroprene | 1 |
| Propylene oxide | 6 |

Example II

|  | Parts by weight |
|---|---|
| Polymerized chloroprene | 1 |
| Furfurane | 7 |

Example III

|  | Parts by weight |
|---|---|
| Polymerized chloroprene | 4 |
| Dioxan | 10 |
| Ether | 7 |
| Methyl acetate | 9 |

The compositions given in the above examples may be prepared by placing the polymerized chloroprene, in the form of small pieces of sheet material, in the solvent and stirring or otherwise agitating until solution is attained.

In Example III, it will be noted, the low-boiling diluents ether and methyl acetate have been employed, which have the effect of causing the composition to dry more readily. Where rapid drying is not desired or required, the diluents may be omitted or replaced by other and less volatile materials.

In general, in preparing compositions according to this invention, the choice of the particular cyclic ether solvent material will depend in part upon the volatility desired in the solvent portion of the composition. One of the cyclic ethers of the glycols may be employed, or several in combination. Furthermore, a relatively high boiling cyclic ether may be employed in combination with other and more volatile solvents or non-solvents in order to impart the desired properties to the composition. In view of the extreme volatility of ethylene oxide, compositions embodying the same may be prepared and maintained at low temperatures, or the ethylene oxide may first be dissolved in one of its solvents.

Moreover, under suitable circumstances, various compounding ingredients may be employed in compositions prepared according to this invention, including, for example, vulcanizing agents, accelerators of vulcanization, stabilizers, and fillers.

It should be noted that, due to the high solubility of polymerized haloprenes, particularly polymerized chloroprene, in cyclic ethers of the glycols, compositions containing high percentages of polymerized chloroprene may be prepared, and of a fluid, freely flowing character. A consequent advantage is that films of polymerized chloroprene may be deposited from such compositions with a minimum of coating applications. The compositions of this invention may of course be employed for a number of adhesive, coating, and analogous purposes and in association with many materials. In view of the substantial insolubility of rubber in the cyclic ethers of the glycols, however, a particular advantage arises in the use of such compositions in connection with rubber surfaces where freedom from solvent attack on the rubber is desired.

A form of polymerized chloroprene suitable for the purposes of this invention is the synthetic rubber-like material known commercially as "Du-Prene", and which may be made by polymerizing chloroprene in the manner set forth in United States Letters Patent No. 1,950,436, granted March 13, 1934, upon an application of Ira Williams. The chloroprene itself may be made in the manner described in United States Letters Patent No. 1,950,431, granted March 13, 1934, upon an application of W. H. Carothers and A. M. Collins. So far as applicable to the purposes of this invention, other haloprenes are to be considered as equivalents of chloroprene, for example, bromoprene, described in said Patent No. 1,950,431. The polymerization of bromoprene is described in United States Letters Patent No. 1,950,433, granted March 13, 1934, upon an application of W. H. Carothers and A. M. Collins.

Having described my invention, what I claim as new and desire to secure by Letters Patent of the United States is:

1. A composition comprising polymerized haloprene dissolved in a cyclic ether of the glycols.
2. An adhesive composition comprising polymerized chloroprene dissolved in solvent material selected from a class consisting of propylene oxide, furfurane, and dioxan.
3. A composition comprising polymerized chloroprene dissolved in propylene oxide.
4. A composition comprising polymerized chloroprene dissolved in furfurane.
5. A composition comprising polymerized chloroprene dissolved in dioxan.
6. A composition comprising polymerized chloroprene dissolved in dioxan, and a low-boiling diluent.
7. A composition comprising polymerized chloroprene dissolved in a cyclic ether of the glycols.

ALEXANDER D. MACDONALD.